United States Patent Office 3,210,215
Patented Oct. 5, 1965

3,210,215
PROCESS FOR COATING SUBSTRATES WITH COMPOSITIONS COMPRISING VINYL CHLORIDE POLYMERS AND POLYISOCYANATE MODIFIED POLYESTERS OF ALIPHATIC ACIDS AND DIOLS WITH CARBON : OXYGEN CONTENT OF AT LEAST 5 : 2
Roxburgh Richmond Aitken, Lawrence Michael Dadson, and Thomas James Meyrick, all of Manchester, England, assignors to Imperial Chemical Industries Limited, London, England, a corporation of Great Britain
No Drawing. Original application Nov. 2, 1959, Ser. No. 850,025. Divided and this application Mar. 26, 1962, Ser. No. 182,630
5 Claims. (Cl. 117—76)

This invention relates to improved polyvinyl chloride compositions especially useful as coatings and adhesives.

This application is a divisional from our copending U.S. application Serial No. 850,025 filed November 2, 1959, and now abandoned.

It is well known that when substrates such as textile materials composed of synthetic fibres are coated with polyvinyl chloride coating compositions they are often unsatisfactory, because adhesion between the applied coating and the textile material or other substrate is poor. The successful coating of substrates such as textile materials composed of regenerated cellulose, polyamides, non-cellulosic polyesters and polyacrylonitrile with polyvinyl chloride compositions is particularly troublesome. Whilst it is known to obtain improved adhesion between polyvinyl chloride coating compositions and synthetic textile materials by the use of polyisocyanates, previously described methods of using such polyisocyanates do not always provide sufficiently improved adhesion and sometimes give rise to undesirable properties in the finished product, e.g., excessive stiffness or discolouration, furthermore such methods sometimes involve the use of special copolymers of vinyl chloride.

It has now been found that the adhesion between polyvinyl chloride coating compositions and substrates such as the textile materials composed of synthetic fibres mentioned above can be improved by incorporating with the polyvinyl chloride coating compositions, a polyisocyanate or a substance capable of behaving as a polyisocyanate when heated and an isocyanate-reactive polyester which is completely liquid above 20° C. and preferably above 15° C. and which is obtained by the condensation of straight-chain aliphatic $\alpha,\omega$-diols and straight chain aliphatic $\alpha,\omega$-dicarboxylic acids optionally together with up to 20% molar of other diols and dicarboxylic acids the reagents being chosen so that in the polyester produced the ratio of the total number of carbon atoms present to the total number of oxygen atoms is at least 5 to 2. Examples of such polyesters are given in U.S. Patent 2,749,329 and in our British Patents 804,839 and 807,243.

Thus, according to the present invention we provide improved polyvinyl chloride compositions characterised in that the compositions contain a polyisocyanate or a substance capable of behaving as a polyisocyanate when heated and an isocyanate reactive polyester as hereinbefore defined which is completely liquid above 20° C. and preferably above 15° C.

The liquid isocyanate reactive polyester we employ in our invention are predominantly chain terminated by hydroxyl groups. They are excellent plasticisers for polyvinyl chloride. They may be incorporated with the polyvinyl chloride coating compositions in presence or absence of other plasticisers which are non-reactive towards isocyanates as well as of the pigments, solvents, fillers and stabilisers commonly added to the polyvinyl chloride coating compositions.

The polyisocyanates to be used may be any polyisocyanate such as 1:6-hexamethylene diisocyanate, 2:4-toluene diisocyanate, 2:6-toluene diisocyanate and mixtures thereof, diphenylmethane diisocyanate, diphenylmethane diisocyanates such as are disclosed in British Patent 842,154 and U.S. Patent 3,012,008, 4:4′:4″-triphenylmethane triisocyanate, and 3:3′-dimethylphenylene-4:4′-diisocyanate. It is preferred, however, since the coatings are cured at elevated temperatures to use isocyanates which are of low volatility as exemplified by the above diphenylmethane diisocyanates, and the above triisocyanates or to use derivatives of polyisocyanates that are obtained by reaction of di and/or trihydric alcohols with diisocyanates, or to use isocyanurate polymers as disclosed in British Patent 809,809, which derivatives and isocyanurate polymers behave as polyisocyanates when heated.

Usually the polyisocyanate or substance capable of behaving as a polyisocyanate is present in amount of from 2% to 20% by weight of the polyvinyl chloride in the composition, and preferably from 5% to 15% by weight of the polyvinyl chloride. The liquid polyester as defined above is present in amount of from 5% to 50% by weight of the polyvinyl chloride in the composition, and preferably from 5% to 25% by weight of the polyvinyl chloride.

When the compositions of the present invention are employed for coating they may be applied from solution in which all the ingredients, including isocyanate and polyester, are dissolved, the isocyanate being added immediately before application. Alternatively and more conveniently, the isocyanate and polyester may be added, the isocyanate preferably immediately before application, to a plastisol, that is a suspension of finely divided polyvinyl chloride in a non-isocyanate reactive plasticiser, or to an organosol, that is a suspension of polyvinyl chloride in a mixture of solvent and a non-isocyanate reactive plasticiser. The coatings are cured by heating. If desired, further coatings free from isocyanate and polyester may be applied in order to obtain special effects.

Although the polyvinyl chloride compositions of the present invention are especially valuable for use as textile coatings they are also valuable for coating a wide variety of other substrates composed of natural and synthetic materials. Thus for example the polyvinyl chloride compositions may be employed to coat articles made from natural and synthetic rubbers and other polymers, e.g., natural rubber, polyurethane rubber, butadiene acrylonitrile rubber, styrene/butadiene rubber, polyvinyl chloride, polyamides, polyethylene, polypropylene, polyetetrafluoroethylene, polyethylene terephthalate, phenol-formaldehyde resins, melamine-formaldehyde resins, urea-formaldehyde resins, leather and wood.

The polyvinyl chloride compositions of the present invention may also be employed as adhesives and are particularly useful for bonding articles composed of polyvinyl chloride to other articles composed either of polyvinyl chloride or of some other material. Thus for example the compositions may be used in the manufacture of footware moulded from polyvinyl chloride to affix soling materials composed of polyurethane or other rubbery materials thereto. They may also be used for bonding polyvinyl chloride films to metals. When the compositions are used as adhesives to bond polyvinyl chloride articles to other articles made from polyvinyl chloride or some other material the articles are coated with the polyvinyl chloride composition and brought into contact with each other, preferably under pressure, the bonding process being completed by applying heat.

The invention is illustrated but not limited by the following examples in which parts and percentages are by weight.

Example 1

A mixture of 1544 parts of 1:5-pentane diol, 1056 parts of glutaric acid and 779 parts of adipic acid was heated and stirred at 250° C. in a stream of inert gas until the acid value was less than 0.3 mg. KOH/g. The polyester so produced had acid value 1.3 mg. KOH/g., hydroxyl value 36.7 mg. KOH/g., viscosity at 25° C. 105 poise and was completely liquid at temperatures above 13.5° C.

200 parts of 2:4-tolylene diisocyanate, 23 parts of glycerol and 21.2 parts of diethylene glycol were heated together in ethyl acetate at 75–80° C. for one hour to give a reaction product A containing 75% solids.

A plastisol was prepared according to the following recipe:

| | Parts |
|---|---|
| Paste-making vinyl chloride polymer | 100 |
| Calcium stearate | 2 |
| Tritolyl phosphate | 80 |
| Polyester, as described above | 10 |
| Reaction product A | 10 |

A strip of light-weight "Terylene" (polyethylene terephthalate) fabric (89 gms./sq. yd.) was coated with this plastisol. The coated fabric was heated for 10 minutes at 120° C. Further coats of plastisol, prepared in absence of reaction product A but otherwise the same as that described above, were then applied, and the coating B gelled by heating for 5 minutes at 170° C. The bond strength between coating B and the substrate was assessed by measuring the force needed to part the coating from the fabric, across a one-inch strip. This was found to be 15 lbs./in. width as compared with 2.4 lbs./in. width for a plastisol coating containing no isocyanate reaction product A but otherwise identical with coating B.

Replacement of the polyester in the plastisol recipes used for producing coating B described by an equal weight of polypropylene adipate resulted in a coated fabric in which the bond strength between coating and substrate was 5.8 lbs./in. width. When polypropylene sebacate was used as the polyester the bond strength was 9 lbs./in. width.

Example 2

A cured cast polyurethane rubber was solvent wiped, to remove mould lubricant, lightly abraded to remove the glossy surface skin and solvent wiped to remove abraded particles. The solvent used was ethanol. The rubber was painted with a plastisol compounded as described in Example 1 (i.e., containing reaction product A). Further coats of plastisol, prepared in the absence of reaction product A, were then applied and the coating B gelled by heating for 5 minutes at 170° C. A good bond between coating and substrate was obtained.

The procedure was repeated but using throughout a plastisol containing no reaction product A. A very poor bond between coating and substrate was obtained.

Example 3

A sheet of butadiene-acrylonitrile rubber was prepared from the following ingredients:

| | Parts |
|---|---|
| Butadiene-acrylonitrile rubber | 100 |
| Zinc oxide | 5 |
| Sulphur | 1 |
| Tetramethyl thiuram monosulphide | 2 |
| Stearic acid | 1 |
| Aluminium silicate | 70 |
| Diethylene glycol | 3 |

The above mixture was vulcanised for 15 minutes at 106° C.

The surface of the rubber sheet was abraded and solvent-wiped, then painted with the following adhesive:

| | Parts |
|---|---|
| Polyvinyl chloride | 100 |
| Calcium stearate | 2 |
| Tritolyl phosphate | 80 |
| Isocyanate reaction product A as used in Example 1 | 10 |
| Reactive polyester as used in Eample 1 | 10 |

Following application of the above adhesive a coating of a polyvinyl chloride plastisol comprising:

| | Parts |
|---|---|
| Polyvinyl chloride | 100 |
| Calcium stearate | 2 |
| Tritolyl phosphate | 80 | was applied

The coated sheet was heated for 10 minutes at 160° C. and an excellent bond was obtained between the nitrile rubber and the polyvinyl chloride coating.

When similar sheets of nitrile rubber were coated with polyvinyl chloride in absence of the above adhesive adhesion was very poor and the polyvinyl chloride layer could readily be peeled off.

Example 4

A polyvinyl chloride composition was prepared from the following ingredients:

| | Parts |
|---|---|
| Polyvinyl chloride | 100 |
| Cadmium-barium laurate | 2 |
| Epoxidised soyabean oil | 3 |
| Acid-modified polypropylene adipate | 55 |

The composition was gelled on a mill at 160° C.

The sheets of this composition were painted with the same adhesive as that employed in Example 3 and the two adhesive surfaces were placed in contact. This assembly was heated for 20 minutes at 120° C. and a good bond was obtained.

When a polyvinyl chloride plastisol containing no polyisocyanate and polyisocyanate reactive polyester was employed as adhesive for combining sheets of the above polyvinyl chloride composition the sheets could afterwards be easily separated and the bond was extremely poor.

What we claim is:

1. A process for coating materials with polyvinyl chloride composition which comprises applying to a substrate a coating of a composition comprising polyvinyl chloride and a member of the group consisting of polyisocyanate and substances capable of behaving as polyisocyanates when heated but which do not function as isocyanates until heated, and an isocyanate-reactive polyester which is completely liquid above 20° C. and which is obtained by the condensation of a mixture of straight-chain aliphatic $\alpha,\omega$-diols and straight-chain $\alpha,\omega$-dicarboxylic acids, the ratio of the total number of carbon atoms in said polyester to the total number of oxygen atoms therein being at least 5:2, and thereafter heating the coated material.

2. A process as set forth in claim 1 including the step of applying over said composition a further coating comprising said polyvinyl chloride composition free from said member of the group consisting of polyisocyanate and substances capable of behaving as polyisocyanates before the coated substrate is heated.

3. A process as set forth in claim 1 in which, in said polyvinyl chloride composition, there is also present a plasticizer which is non-reactive towards isocyanates.

4. A process as set forth in claim 1 in which, in said polyvinyl chloride composition, said member of the group consisting of polyisocyanates and substance capable of behaving as polyisocyanates is present in an amount of from 2% to 20% by weight of the polyvinyl chloride in the composition, and wherein said polyester is present in an amount of from 5 to 50% by weight of the polyvinyl chloride in the composition.

5. A process as set forth in claim 1 in which said substance capable of behaving as a polyisocyanate is obtained by reacting a member of the group consisting of di- and tri-hydric alcohols with diisocyanates.

References Cited by the Examiner

UNITED STATES PATENTS

| | | | |
|---|---|---|---|
| 2,606,162 | 8/52 | Coffey et al. | 260—859 |
| 2,851,436 | 9/58 | Forsythe | 260—859 |
| 2,884,340 | 4/59 | Loshaek | 117—76 |
| 2,888,433 | 5/59 | Parker | 260—17.4 |
| 2,893,969 | 7/59 | Graham et al. | 260—17.4 |
| 2,898,312 | 8/59 | Szukiewicz et al. | 260—2.5 |
| 2,935,487 | 5/60 | Fox et al. | 260—75 |

WILLIAM H. SHORT, *Primary Examiner.*